(12) United States Patent
Brooker (10) Patent No.: US 9,134,522 B2
(45) Date of Patent: Sep. 15, 2015

(54) AUTOFOCUS APPARATUS

(71) Applicant: Thorlabs, Inc., Newton, NJ (US)

(72) Inventor: Jeffrey S. Brooker, Oak Hill, VA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/466,386

(22) Filed: Aug. 22, 2014

(65) Prior Publication Data

US 2015/0009559 A1    Jan. 8, 2015

Related U.S. Application Data

(60) Continuation-in-part of application No. 13/934,727, filed on Jul. 3, 2013, which is a division of application No. 12/906,086, filed on Oct. 16, 2010, now Pat. No. 8,492,693.

(60) Provisional application No. 61/252,263, filed on Oct. 16, 2009, provisional application No. 61/868,881, filed on Aug. 22, 2013.

(51) Int. Cl.
*G02B 21/26* (2006.01)
*G02B 21/24* (2006.01)

(52) U.S. Cl.
CPC .............. *G02B 21/26* (2013.01); *G02B 21/245* (2013.01)

(58) Field of Classification Search
CPC combination set(s) only.
See application file for complete search history.

(56) References Cited

U.S. PATENT DOCUMENTS

| 7,019,309 | B2  | 3/2006 | Gu et al. |
| 2011/0090562 | A1 | 4/2011 | Brooker |
| 2012/0038818 | A1* | 2/2012 | Hamada ........................ 348/349 |
| 2014/0022443 | A1* | 1/2014 | Tay ............................... 348/349 |

FOREIGN PATENT DOCUMENTS

WO    2012170275 A1    12/2012

OTHER PUBLICATIONS

Aaron D. Aguirre et al; "High Speed Optical Coherence Microscopy with Autofocus Adjustment and a Miniaturized Endoscopic Imaging Probe References and Links," Feb. 17, 2010; vol. 18, No. 5; pp. 1178-1181; Optics Express; Optical Society of America.

(Continued)

*Primary Examiner* — Francis M Legasse, Jr.
(74) *Attorney, Agent, or Firm* — Graham Curtin, P.A.

(57) ABSTRACT

An autofocus apparatus includes a light source; an optical coupler having a first port, second port and a third port; wherein the optic coupler couples to the light source at the first port; an optical collimator for directing a light output from the second port of the optical coupler onto a sample through a Dichroic mirror and a microscope objective, wherein the sample is placed on a substrate supported by an adjustable microscopy stage; a scanning device for focusing the light at a plurality of focal points along an axis; a photodiode detector for converting a reflected light signal into an intensity signal; a memory device for storing a signal template; and a microprocessor for detecting a peak in the intensity signal by cross-correlating the intensity signal with the signal template; wherein the microprocessor generates a command for moving the position of the adjustable microscopy stage along the axis.

16 Claims, 8 Drawing Sheets

(56) References Cited

OTHER PUBLICATIONS

Lo, Yu-Lung, et al.; "Fiber Type of Optical Coherence Tomography with an Auto-Focus Device," Mar. 1, 2006; vol. 259, No. 1, pp. 70-77; Optics Communications, North-Holland Publishing Co., Amsterdam, NL.

International Search Report mailed Nov. 28, 2014 in corresponding international application No. PCT/US2014/052291.

* cited by examiner

AUTOFOCUS APPARATUS

CROSS-REFERENCE TO RELATED APPLICATIONS

This application claims the benefit of U.S. Provisional Application No. 61/868,881 filed on Aug. 22, 2013, and this application is a continuation in part of pending U.S. patent application Ser. No. 13/934,727 filed on Jul. 3, 2013, which is a divisional application of U.S. patent application Ser. No. 12/906,086 filed on Oct. 16, 2010, now U.S. Pat. No. 8,492,693, which claims the benefit of U.S. Provisional Application No. 61/252,263 filed on Oct. 16, 2009, the disclosures of each are hereby incorporated by reference.

FIELD OF THE INVENTION

The invention generally relates to a microscopy apparatus, and more particularly to techniques for automatically adjusting the position of a stage for attaining proper focus.

BACKGROUND

As with all optical systems, microscopes suffer from diminished depth of field as the magnification and the NA (numerical aperture) of the imaging lens (objective) increases. When using a microscope, the user is responsible for attaining proper focus of the sample by moving the sample relative to the objective. When microscopy is automated and the user is no longer involved in looking at each image, a method of auto focusing is required. In the related art, techniques that achieve automatic focus by gauging the distance between the front lens and the bottom of the container (e.g., slide, well plate, etc.) are described. Such techniques are based on reflecting a beam of light off of the first surface and measuring the reflection. The deficiency of such techniques, however, is that if the container that the sample is on has an inconsistent thickness, as in most plastics, then the resulting image can be off in focus the amount of the deviation of the substrate.

Cellular imaging relies on the growth of cells on the bottom of a glass or plastic substrate. The cells grow parallel to the surface and secrete proteins that cause them to adhere to the substrate. In order to maintain the growth of the cells, nutrient rich liquid medium is added to feed the cells and maintain proper physiological conditions. In this scenario, the surface of the plastic is covered in an aqueous solution, which can be used to detect the position of the cells. The index of refraction change between the plastic and the liquid can be located using a low noise, high sensitivity reflected light setup.

SUMMARY

In an embodiment, an autofocus microscope apparatus is provided. The apparatus includes: a light source; an optical coupler having a first port, second port and a third port; wherein a light signal in the optical coupler travels substantially only from the first port to the second port and from the second port to the third port; wherein the optic coupler couples to the light source at the first port; an optical collimator for directing a light output from the second port of the optical coupler onto a sample through a Dichroic mirror and a microscope objective, wherein the sample is placed on a substrate supported by an adjustable microscopy stage; a scanning means for focusing the light at a plurality of focal points along an axis; a photodiode detector for converting a light signal that includes reflections off of the substrate at the plurality of focal points along the axis, into an intensity signal, wherein the light signal is captured by the microscope objective and sent to the photodiode detector through the Dichroic mirror, the optical collimator, and into the second port and out of the third port of the optic coupler; a memory device for storing a signal template; and a microprocessor for detecting a peak in the intensity signal by cross-correlating the intensity signal with the signal template; wherein the microprocessor generates a command for moving the position of the adjustable microscopy stage along the axis based on a difference between the location of the detected peak in the intensity signal and the location of a peak in a reference signal.

In another embodiment, a method for operating a microscopy apparatus is provided. The method includes: coupling an optical coupler to a light signal output of a light source at a first port, to an optical collimator at a second port, and to a photodiode detector at the third port, wherein the light signal in the optical coupler travels substantially only from the first port to the second port and from the second port to the third port; directing a light beam from the second port of the optical coupler onto a sample by the light collimator through a Dichroic mirror and a microscope objective, wherein the sample is placed on a substrate supported by an adjustable microscopy stage; focusing the light beam at a plurality of focal points along an axis; capturing a reflected light signal that includes reflections of the light beam off of the substrate at the plurality of focal points along the axis by the microscope objective and sending to the photodiode detector through the optical collimator and into the second port and out of the third port of the optic coupler; detecting a peak in the intensity signal by correlating the intensity signal with a stored signal template; and generating a command for moving the position of the adjustable microscopy stage along the axis based on a difference between the location of the detected peak in the intensity signal and the location of a peak in a reference signal.

DETAILED DESCRIPTION OF THE PREFERRED EMBODIMENTS

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts. It is to be noted that all fiber optic systems can be replaced with free space equivalents.

Figure 1:
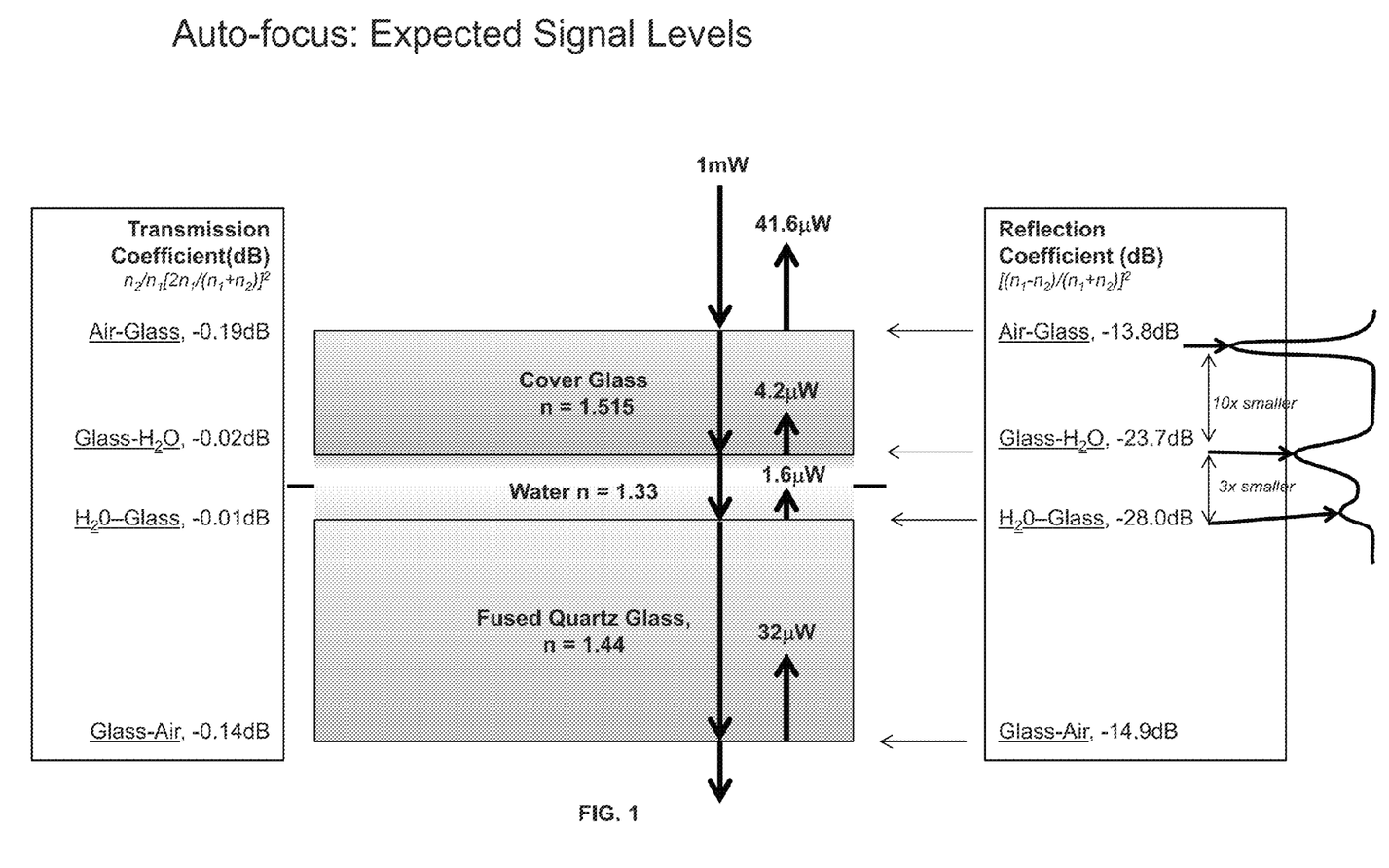
FIG. 1 is a diagram of expected signal levels for reflections from various surface boundaries.

In microscopy, a sample object to be examined is placed on a slide and is cover by a slip cover. The objective of a microscope is adjusted so that a focused view of the magnified object is obtained. When light traveling in a first medium having a first refractive index enters into a second medium having a second reflective index, reflection occurs at the boundary between the two media. The amount of light that gets reflected and the amount of light that gets transmitted at the boundary depend on the refractive indices of the two media. In microscopy, there are typically many different boundaries, e.g. air-glass, glass-water, water-glass, and glass-air, and thus there are different reflection intensity levels corresponding to these boundaries. FIG. 1 shows an example of intensity levels of reflections at the various boundaries when light is focused on these boundary locations. By scanning the reflection intensities at these various point along an axis (without loss of generality, hereinafter referred to as the z-axis), a z-axis reflection profile can be obtained. In a z-axis reflection profile, the various intensity peaks correspond to the various medium boundaries. Therefore, using the z-axis reflection profile, one can adjust the microscope's objective to a position of an intensity level peak that best correlates to the desired optical focus.

Figure 2:
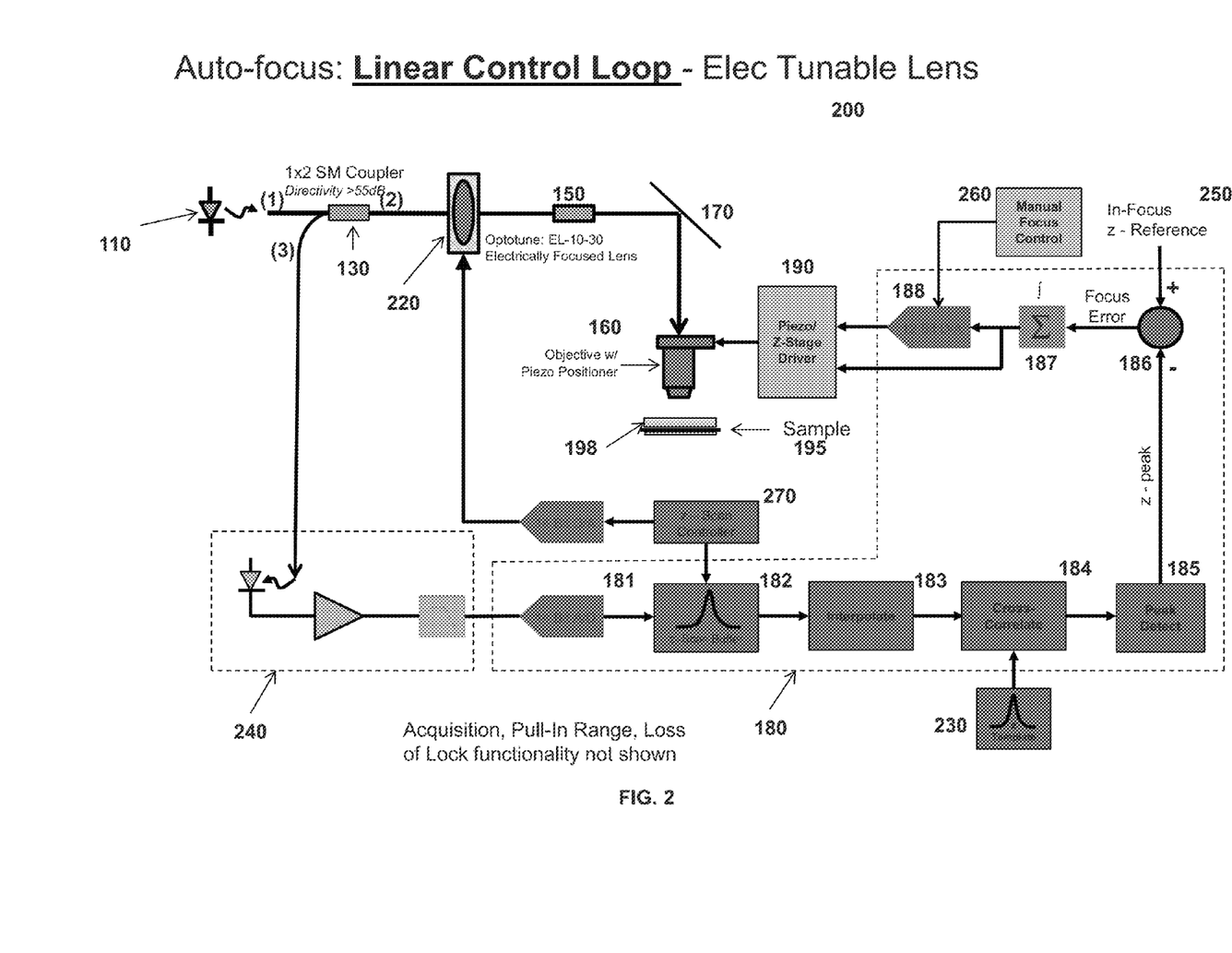
FIG. 2 is a diagram of an autofocus apparatus according to an embodiment.

FIG. 2 shows an exemplary diagram of an autofocus apparatus 200 implemented in accordance with an embodiment. In one embodiment of the invention the wavelength of the light source 110 is a 1310 nm. Other values are contemplated. The optical coupler 130 comprises a first port (1), a second port (2) and a third port (3). The light travels in the optical coupler 130 and outputs at the second port (2), where the light signal is collimated into a beam by the collimator 150. It should be noted that a light signal can travel in the optical coupler 130 substantially only from the first port (1) to the second port (2) and to third port (3). In one embodiment, the directivity of the optical coupler is at least 55 dB.

The beam reflects off of a Dichroic mirror 170, which is designed to only reflect wavelengths above a predefined wavelength and pass anything below. In an exemplary embodiment the predefined wavelength is 1300 nm. The light beam travels through the microscope objective 160 and is focused on the sample 195 placed on an adjustable microscopy stage 198. The light reflects off of the plastic or glass substrate that the sample 195 is placed on, is captured by the objective 160, and then sent back into the fiber by the collimator 150. If the sample 195 is not contained in a glass or plastic substrate, the reflection can come from the sample 195 itself.

The light signal from the collimator 150 is input into the optical coupler 130 at the second port (2) and is output at the third port (3), as the light travels substantially only in one direction through the circulator 130. The output from the optical coupler 130 is fed into the photodiode detector 240. The photodiode detector 240 converts the light signal into a voltage signal output or an intensity signal output.

In one embodiment, the z-scan controller 270 adjusts the electrically focused lens 220 to focus the light at various focal points along the z-axis to obtain the scan data of the reflected light signal.

Figure 3:
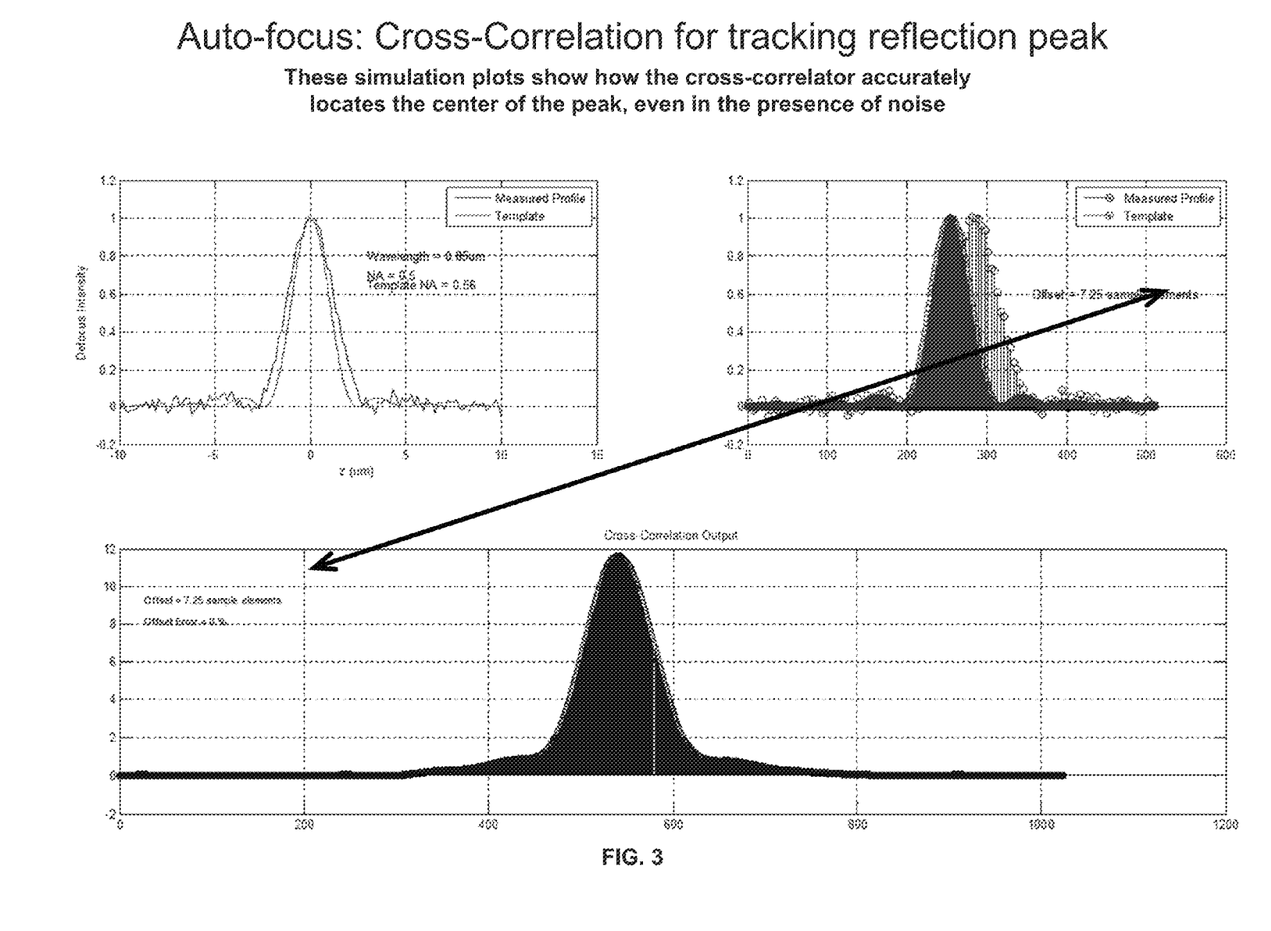
FIG. 3 is a diagram of cross-correlation for tracking reflection peak according to an embodiment.

In one embodiment, the microprocessor 180 includes different processing module, e.g., an A/D converter 181 that converts the analog intensity level signal into a digital signal, a z-scan buffer 182 that holds the digitized scanned data, an interpolator that interpolate the data, a cross-correlator 184 to cross-correlate the interpolated data with a template stored in 230, a peak detector 185 that detects one or more peaks using the results of the cross-correlation, a comparator 186 to determine a shift with respect to an in-focus z-reference signal, an integrator 187 to calculate the shift, and a D/A converter 188 to convert the shift value into a command signal to drive the Piezo stage 190. These modules may be implemented in one or more microprocessors, and with combinations of hardware and/or software components. Alternatively, one or more of these modules can have their own microprocessors. The microprocessor 180 processes the intensity level signal to produce a z-axis scan profile, and cross-correlated with a template stored in a memory device 230 in order to detect one or more peaks in the z-axis scan profile. The use of cross-correlation with a template allows rapid and accurate detection of peaks. FIG. 3 shows the use of a cross-relation of the z-axis profile with a template to accurately locate the center of the peak, even in the presence of noise.

Once a particular peak is detected, the location of the peak is compared with the corresponding peak in an in-focus z-reference signal 250. The in-focus z-reference signal contains a peak that corresponds to a desired focus location selected by the user or automatically determined by the system. Furthermore, the location of the peak may be compared with a corresponding peak in a z-reference signal for moving to a specific location around the peak. In addition, a manual focus control 260 is available for users to select and/or adjust the desired focus location.

It is contemplated that the system may lose focus of the sample, for example: the position of the sample may change over time. When the system is out of focus by a small distance, the z-axis scan profile obtained would be shifted by that small distance relative to a previously obtained in-focus z-axis scan profile. Thus the system can be brought back to focus by shifting the adjustable stage by the distance shifted in the z-axis scan profile.

In an embodiment of the present invention, the system can be realized as a tracking device. Using the principles of the present invention, the tracking device can maintain a specific distance between the device and the sample by tracking a particular peak in the intensity level signal and continuously adjusting the z-position by correlating intensity level signal with a stored profile. When the position of the sample 195 changes, the reflected light signal received the photodiode detector 240 changes. As a result, microprocessor 180 detects a change in the intensity level signal the photodiode detector 240, and detects a change of position of the peak in the intensity level signal by correlating the intensity level signal with a stored profile. Microprocessor 180 generates a corresponding movement command in order to compensate the shift, and thus maintains the same distance between the objective 160 and the sample 195.

To obtain a z-axis reflection profile, light is focused on various points along the z-axis by a scanning means. It is contemplated that the z-axis intensity profile scan can be accomplished by some fast scanning techniques. In confocal microscopy, a spatial pinhole to eliminate out-of-focus light. Therefore by continuously modulating and adjusting the spatial pinhole, a scan of various focal planes can be achieved.

Figure 4:
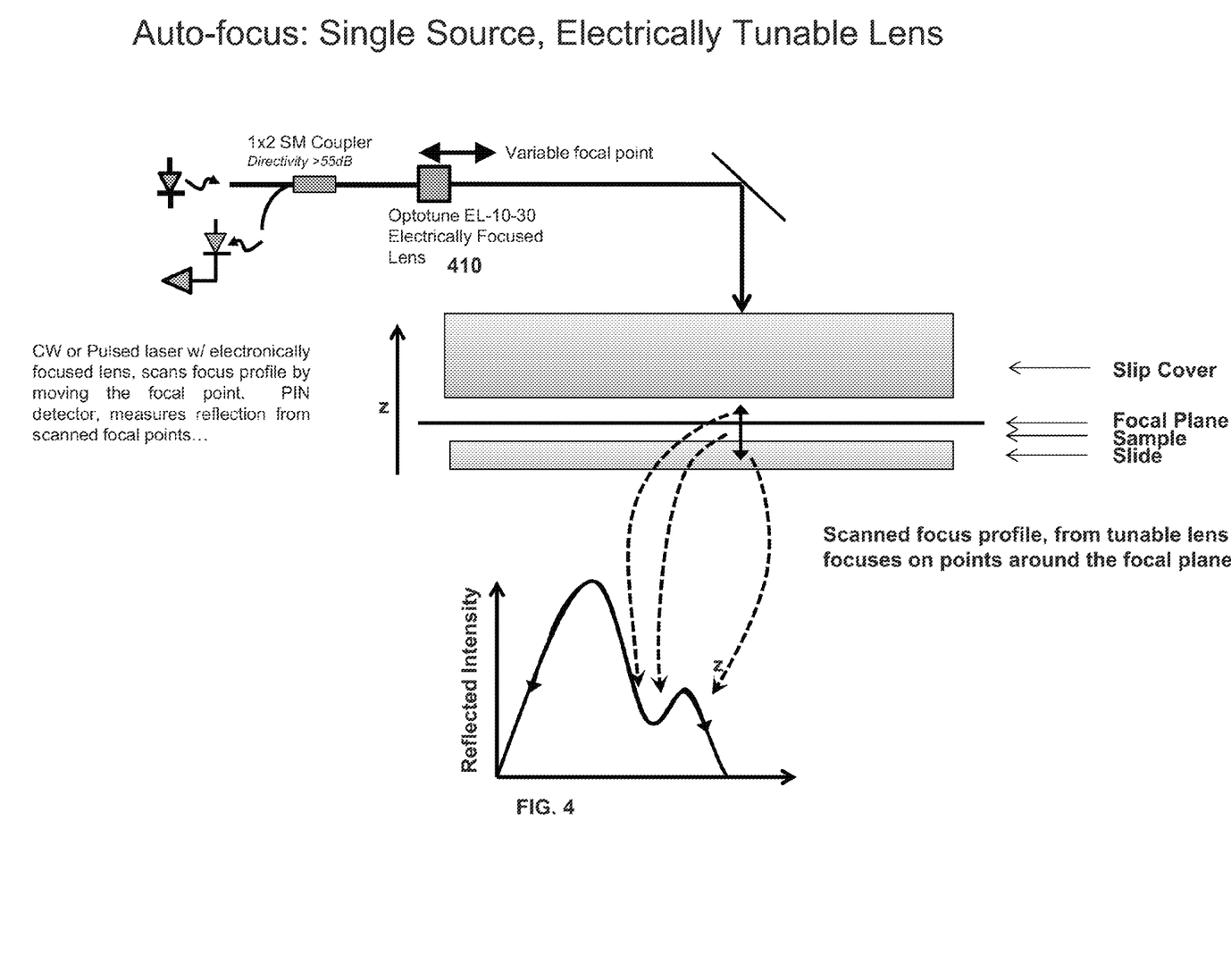
FIG. 4 is a diagram of an autofocus apparatus according to an embodiment.

FIG. 4 shows an embodiment in which an electrically focused lens 410 in used to scan various points along the z-axis and the intensity levels of the reflections at these various points are recorded. Typically the time to complete a z-axis scan is relatively small compare to, for example, the time course of change of intensity of the light source, or a movement of the sample.

Figure 5:
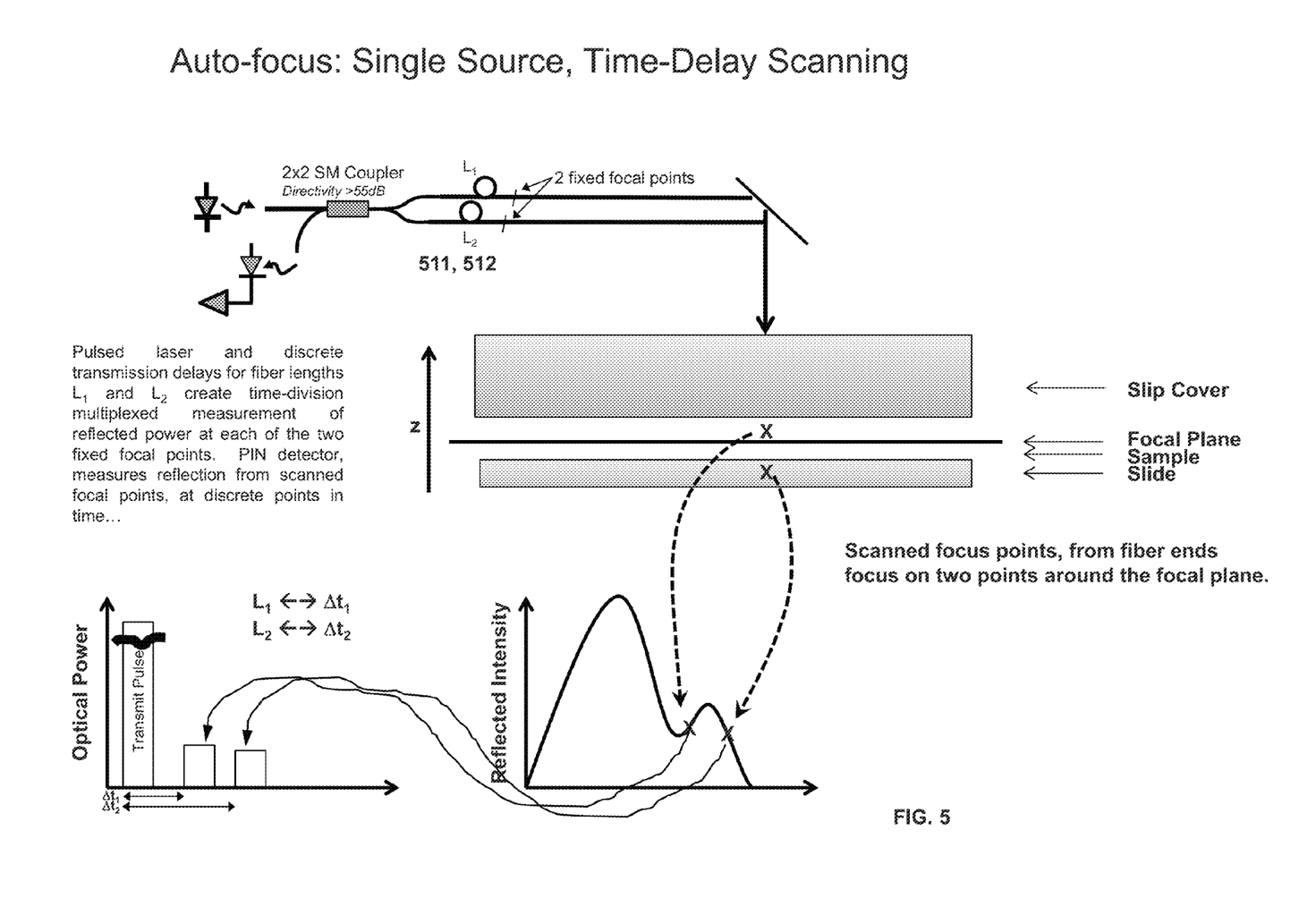
FIG. 5 is a diagram of an autofocus apparatus according to an embodiment.

FIG. 5 shows an embodiment, in which the output of the optical coupler is split into two paths. Discrete transmission delays for fiber lengths L1 and L2 (511-512) create a time-division multiplexed measurement of reflected power at each of the two fixed focal points. The two focal points include one point on each side the focal plane. The measured optical power over these two discrete time points can be mapped to the reflected intensity profile.

Figure 6:
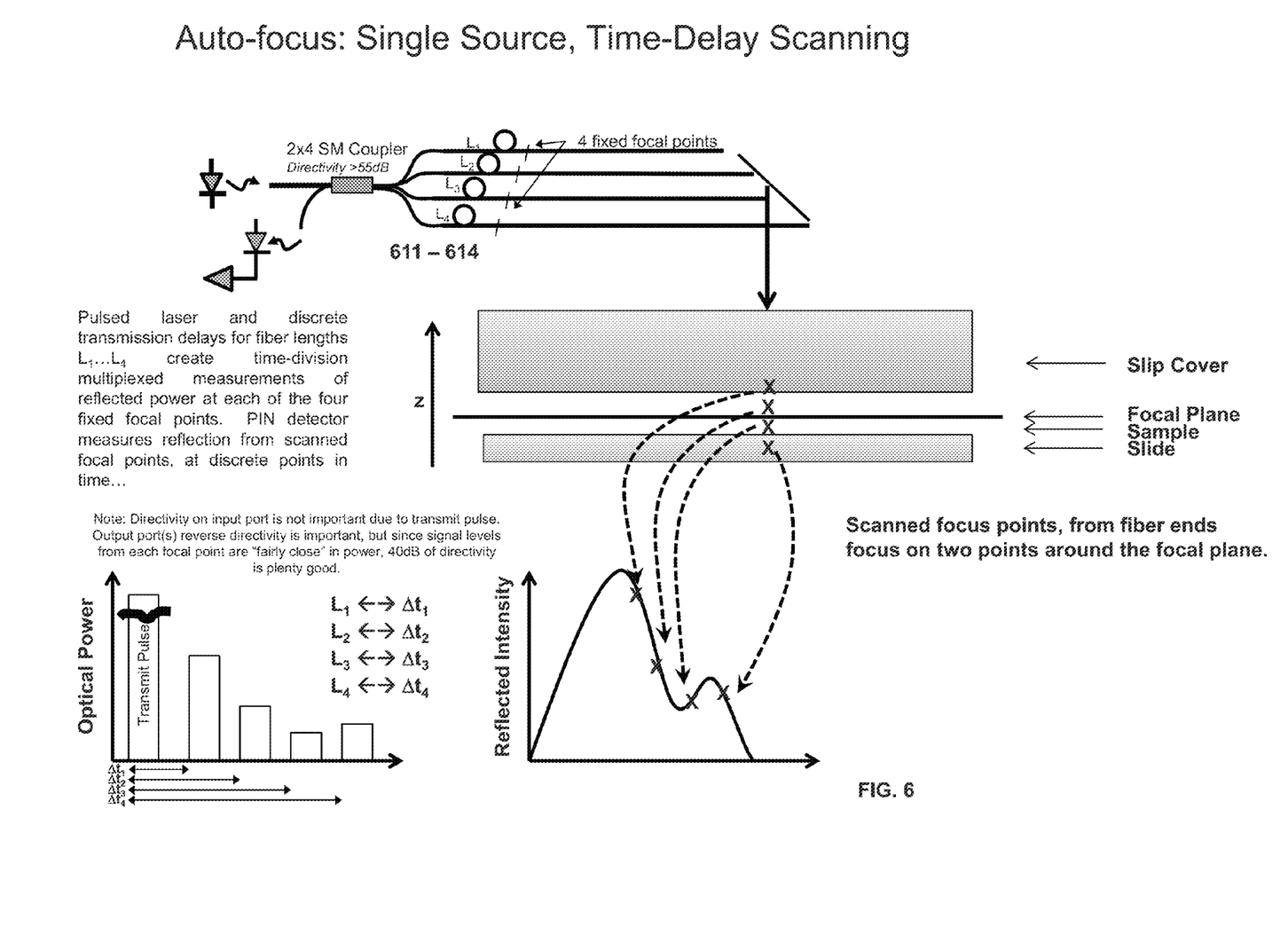
FIG. 6 is a diagram of an autofocus apparatus according to an embodiment.

FIG. 6 shows an embodiment, in which the output of the optical coupler is split into four paths. Discrete transmission delays for fiber lengths L1, L2, L3 and L4 (611-614) create a time-division multiplexed measurement of reflected power at each of the four fixed focal points. The four focal points include two points on each side the focal plane. The measured optical power over these four discrete time points can be mapped to the reflected intensity profile. The optical coupler and the photodiode detector are not shown for simplicity.

Figure 7:
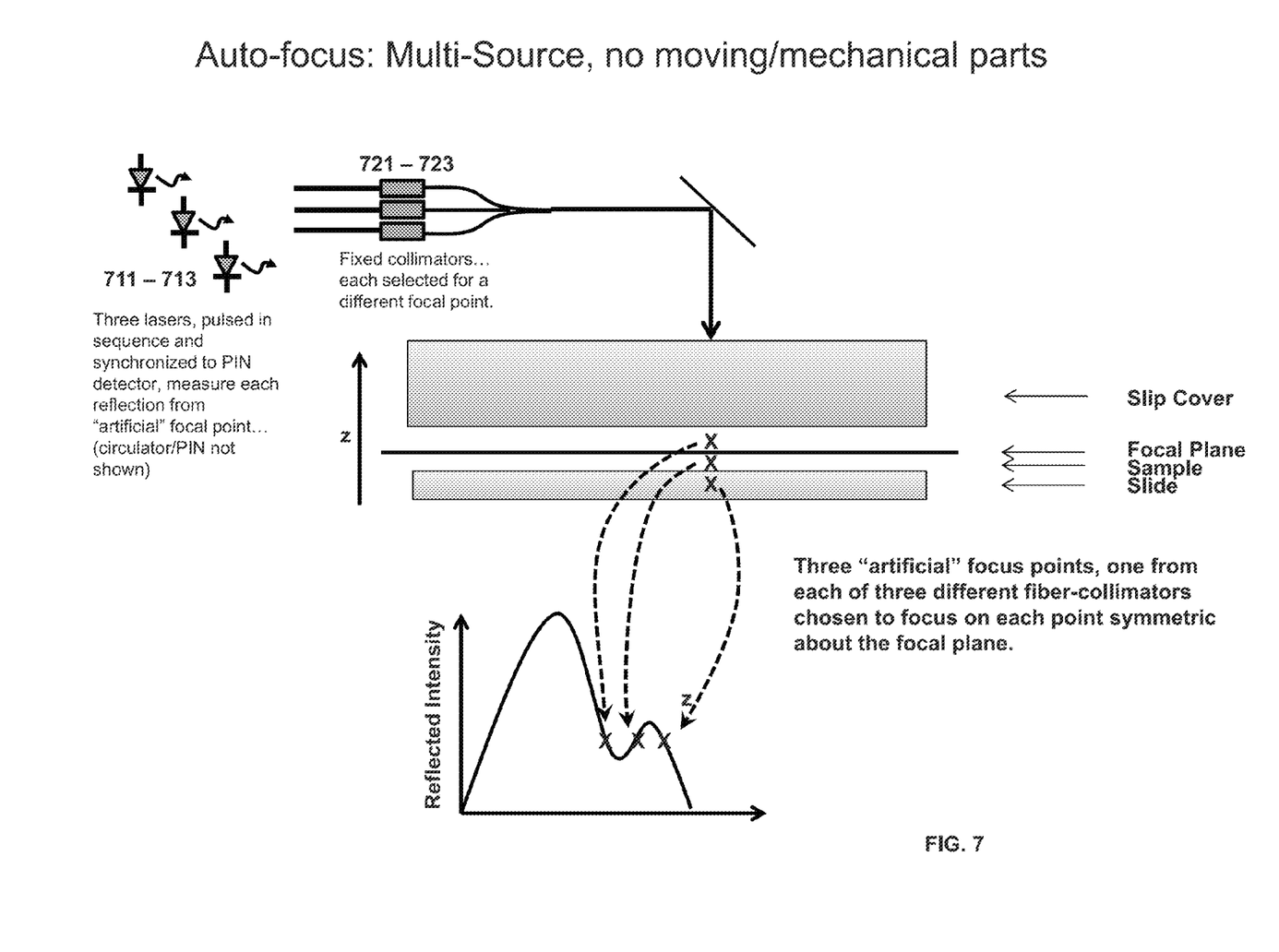
FIG. 7 is a diagram of an autofocus apparatus according to an embodiment.

FIG. 7 shows an embodiment, in which three lasers 711-713 are pulsed in sequence and synchronized with the photodiode detector for obtaining the z-axis profile scan. Three fixed collimators 721-723, each selected for a different focal point is coupled the three lasers respectively. Three "artificial" focus points, one from each of three different fiber-collimators, are chosen to focus on each point symmetric about the focal plane. The optical coupler and the photodiode detector are not shown for simplicity.

Figure 8:
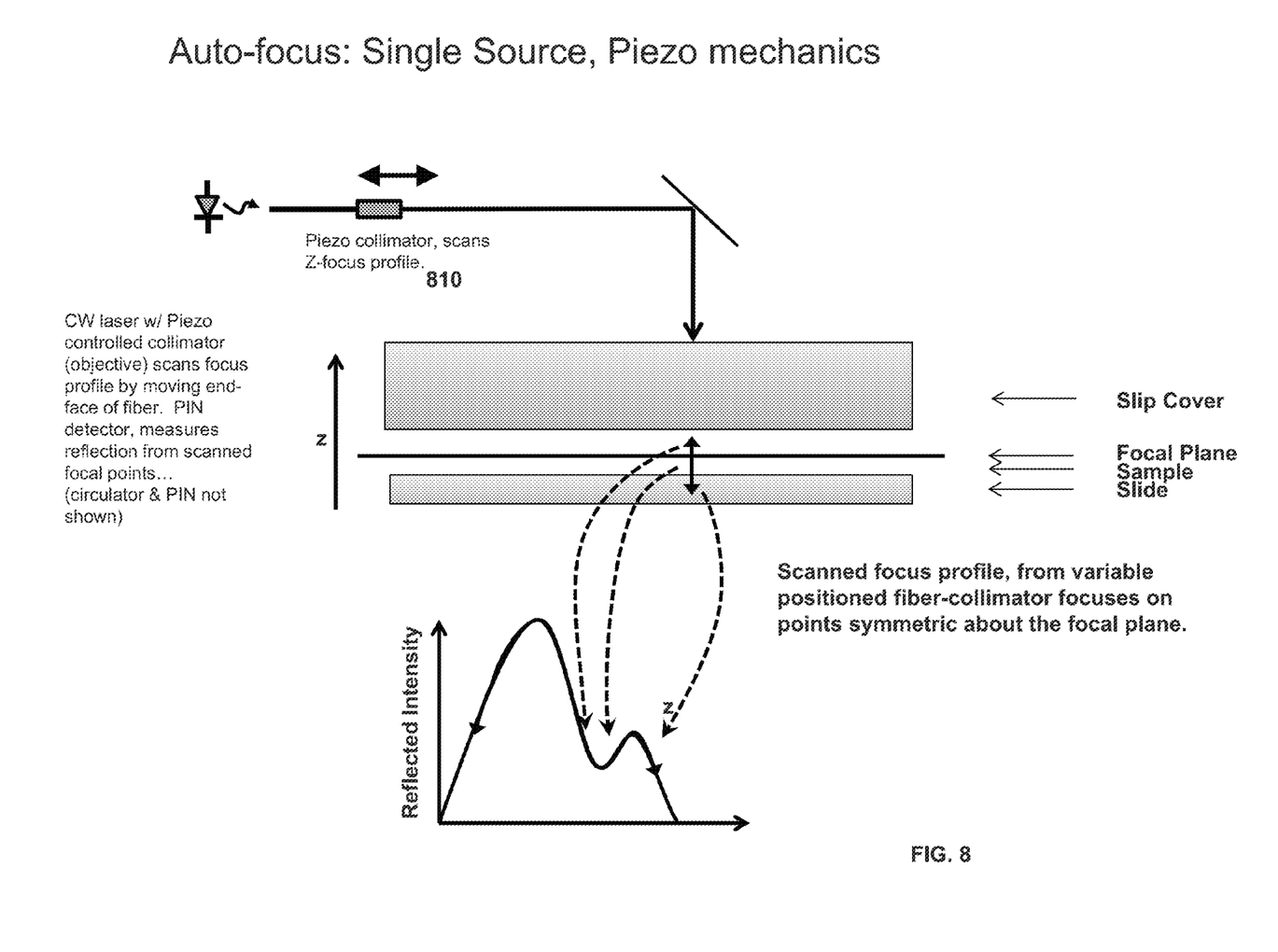
FIG. 8 is a diagram of an autofocus apparatus according to an embodiment.

FIG. 8 shows an embodiment, in which a Piezo controlled collimator 810 is used to scan the z-axis profile by moving the end face of the fiber. The Piezo controlled collimator produces a variable fiber-collimator position and thus focuses on various points symmetric about the focal plane. The optical coupler and the photodiode detector are not shown for simplicity.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An autofocus apparatus, comprising:
    a light source;
    an optical coupler having a first port, second port and a third port; wherein a light signal in the optical coupler travels substantially only from the first port to the second port and from the second port to the third port; wherein the optic coupler couples to the light source at the first port;
    an optical collimator for directing a light output from the second port of the optical coupler onto a sample through a Dichroic mirror and a microscope objective, wherein the sample is placed on a substrate supported by an adjustable microscopy stage;
    a scanning means for focusing the light at a plurality of focal points along an axis;
    a photodiode detector for converting a light signal that comprises reflections off of the substrate at the plurality of focal points along the axis, into an intensity signal, wherein the light signal is captured by the microscope objective and sent to the photodiode detector through the Dichroic mirror, the optical collimator, and into the second port and out of the third port of the optic coupler;
    a memory device for storing a signal template; and
    a microprocessor for detecting a peak in the intensity signal by cross-correlating the intensity signal with the signal template;
    wherein the microprocessor generates a command for moving the position of the adjustable microscopy stage along the axis based on a difference between the location of the detected peak in the intensity signal and the location of a peak in a reference signal.

2. The apparatus of claim 1, wherein the microprocessor continuously detects the peak in the intensity signal and generates the command moving the position of the adjustable microscopy stage along the axis to maintain a desired optical focus based on the difference between the location of the detected peak in the intensity signal and the location of a peak in a reference signal.

3. The apparatus of claim 1, wherein the scanning means comprises an electrically focused lens and a controller for adjusting the focus of the electrically focused lens.

4. The apparatus of claim 1, wherein the scanning means comprises a plurality of lengths of fiber having different transmission delays.

5. The apparatus of claim 1, wherein the scanning means comprises a plurality of lasers and a corresponding fixed collimator corresponding to each of the plurality of lasers for a different focal point.

6. The apparatus of claim 1, wherein the scanning means comprises a piezo collimator.

7. The apparatus of claim 1, wherein the optical coupler comprises a fiber optic circulator.

8. The apparatus of claim 1, wherein the optical coupler comprises an optical isolator.

9. A method for automatically operating an autofocus apparatus, the method comprising:
    coupling an optical coupler to a light signal output of a light source at a first port, to an optical collimator at a second port, and to a photodiode detector at the third port, wherein the light signal in the optical coupler travels substantially only from the first port to the second port and from the second port to the third port;
    directing a light beam from the second port of the optical coupler onto a sample by the light collimator through a Dichroic mirror and a microscope objective, wherein the sample is placed on a substrate supported by an adjustable microscopy stage;
    focusing the light beam at a plurality of focal points along an axis;
    capturing a reflected light signal that comprises reflections of the light beam off of the substrate at the plurality of focal points along the axis by the microscope objective and sending to the photodiode detector through the optical collimator and into the second port and out of the third port of the optic coupler;
    converting the reflected light signal into an intensity signal by the photodiode detector; and
    detecting a peak in the intensity signal by correlating the intensity signal with a stored signal template; and
    generating a command for moving the position of the adjustable microscopy stage along the axis based on a difference between the location of the detected peak in the intensity signal and the location of a peak in a reference signal.

10. The method of claim 9, further comprising continuously detecting the peak in the intensity signal and generating the command moving the position of the adjustable microscopy stage along the axis to maintain a desired optical focus based on the difference between the location of the detected peak in the intensity signal and the location of a peak in a reference signal.

11. The method of claim 9, wherein the focusing the light beam at a plurality of focal points along the axis comprises electrically controlling a tunable lens.

12. The method of claim 9, wherein the focusing the light beam at a plurality of focal points along the axis comprises using a pulsed laser and a plurality of lengths of fiber having different transmission delays.

13. The method of claim 9, wherein the focusing the light beam at a plurality of focal points along the axis comprises using a corresponding fixed collimator corresponding to each of the plurality of lasers for a different focal point.

14. The method of claim 9, wherein the focusing the light beam at a plurality of focal points along the axis comprises controlling a piezo collimator.

15. The method of claim 9, wherein the optical coupler comprises a fiber optic circulator.

16. The method of claim 9, wherein the optical coupler comprises an optical isolator.

* * * * *